United States Patent [19]
Livingston

[11] Patent Number: 5,973,309
[45] Date of Patent: Oct. 26, 1999

[54] TARGET-TRACKING LASER DESIGNATION

[75] Inventor: Peter M. Livingston, Palos Verdes, Calif.

[73] Assignee: TRW Inc., Redendo Beach, Calif.

[21] Appl. No.: 08/919,412

[22] Filed: Aug. 27, 1997

[51] Int. Cl.$^6$ .................................................. G01S 17/66
[52] U.S. Cl. ................................... 250/203.1; 250/203.2; 356/139.04
[58] Field of Search ............................. 250/203.1, 203.2, 250/203.6; 356/139.04

[56] References Cited

U.S. PATENT DOCUMENTS

| | | | |
|---|---|---|---|
| 3,696,248 | 10/1972 | Cunningham et al. | 250/203.2 |
| 3,811,748 | 5/1974 | Treuthart | 359/221 |
| 4,123,651 | 10/1978 | Mongeon | 250/203.2 |
| 4,129,775 | 12/1978 | O'Meara | 250/203.2 |
| 4,234,145 | 11/1980 | Leiboff | 244/3.16 |
| 4,385,834 | 5/1983 | Maxwell, Jr. | 356/153 |
| 4,401,886 | 8/1983 | Pond et al. | 250/203.1 |
| 5,198,607 | 3/1993 | Livingston et al. . | |
| 5,216,236 | 6/1993 | Blais | 250/203.2 |
| 5,457,310 | 10/1995 | Fournier | 250/206.2 |
| 5,770,850 | 6/1998 | Bowen et al. | 250/203.1 |

FOREIGN PATENT DOCUMENTS

| | | |
|---|---|---|
| 0800095 | 3/1997 | European Pat. Off. . |

OTHER PUBLICATIONS

"Boresighting a Gaussian Beam on a Specular Target Point: A Method Using Conical Scan," Erteza, Ahmed, *Applied Optics*, vol. 15, 1976 pp. 656–660.

"Laser Beam Active Tracking for Specular Objects to Fractions of $\lambda/D$" Livingston, Peter, M., Jacoby, Jerold L., and Tierney, William S., *Applied Optics*, vol. 24, 1985 pp. 1919–1925.

*Primary Examiner*—Edward P. Westin
*Assistant Examiner*—Thanh X. Luu
*Attorney, Agent, or Firm*—Michael S. Yatsko

[57] ABSTRACT

The present invention provides a laser tracking system including a laser generator for generating a beam of laser energy, a beam steerer for steering the beam of laser energy such that it moves in a search pattern, and a receiving device that receives laser energy reflected from a targeted object and that causes the beam steerer to vary the search pattern in response to the reflected laser energy. A tracking method associated with the laser tracking system includes the steps of generating a beam of laser energy, steering the beam of energy in a search pattern, detecting a hit spot formed from laser energy being reflected from a targeted object, diminishing the size of the search pattern in response to the detection of the hit spot, and focusing the diminished search pattern on a feature of the targeted object corresponding to the hit spot. The laser tracking system and associated method presented provide a number of advantages over conventional tracking systems. The laser tracking system employs closed loop methodologies allowing the system to accurately track targeted objects using continuously updated tracking data. The laser tracking system is able to seek and lock on to vulnerable features of potential targets. Further, the laser tracking system is able to maintain a desired aim point indefinitely and without operator intervention. This aim point maintenance allows an associated weapon to disable a target, despite any relative tracker-target motion during the munitions launch and flight.

13 Claims, 3 Drawing Sheets

TARGET-TRACKING LASER DESIGNATION

BACKGROUND OF THE INVENTION

1. Technical Field

The present invention relates generally to systems for tracking moving objects and, in particular, to a self-referencing imaging tracker employing a laser designator that allows a desired target aim point to be maintained until a target kill is achieved.

2. Discussion

It is well known to use laser designators for target aim point designation. Some laser designation units are small enough to mount on the barrel of a pistol or rifle. There is a larger class of designators, however, that are used for aim point designation on targets such as tanks or aircraft. For such designators, it is necessary to provide a means for maintaining the aim point at or near a fixed place on the target as the target moves in the field. It is especially critical to maintain the laser designated aim point on the target for at least the length of time it takes to launch munitions. In conventional tracking systems, the laser designated aim point is often maintained by a human operator.

Non-imaging, laser designating trackers may also be employed using self-referencing methodologies, such as the systems disclosed in pending U.S. patent application Ser. No. 08/631,645, entitled "Laser Cross Body Tracking System and Method", and U.S. patent application Ser. No. 08/760,434, entitled "Laser Cross Body in Feature Curvature Tracker", both incorporated herein by reference.

Non-imaging self-referencing trackers are presently deployed as Vernier trackers as an adjunct to imaging trackers; that is, the trackers correct residual image jitter created by imperfect image tracker performance. Thus, the non-imaging tracker bears the major tracking burden for difficult targets, such as small artillery rounds or maneuvering cruise missiles. Non-imaging, self-referencing trackers use a laser beam to seek and hold a glint spot, typically found on a reflective curved surface such as a cylindrical missile housing.

Non-imaging laser designation devices may be combined with tracking systems. However, the conventional systems combining these techniques employ non-self-referencing open loop methods and suffer from significant limitations. The conventional devices typically require a pilot or operator to maintain the target image-laser beam glint aim point during the munitions flight. Alternatively, the location of the aim point must be inferred based on the previous movements of the target as followed and recorded by the tracker. For difficult to track targets, the conventional devices are often unable to select a vulnerable portion of the target as a desired aim point. Still other systems are unable to correct aim point errors resulting from relative motion of the tracking system or the target. Even systems employing self-referencing laser designation are susceptible to losing target lock in the event that the glint point becomes shielded or otherwise obstructed.

SUMMARY OF THE INVENTION

Accordingly, a preferred embodiment of the present invention provides a laser based self-referencing tracker which overcomes the above problems. The laser tracking system of the present invention employs a laser beam designator to seek and lock on to vulnerable portions of a target. The laser tracking system also uses imaging methodologies to lock on to an image of a targeted object. After locking on to the target, the laser designator tracking system continuously generates positional error signals in a closed loop manner. These error signals allow for instantaneous correction of laser designator aim point errors resulting from any relative motion of the target relative to the laser tracking system. The instantaneous, closed loop aim point correction allows the laser tracking system to maintain the laser designator beam at a fixed point on the target until the launched munition "homes" in on the laser spot. Further, these advantages are obtained with minimal operator intervention and control.

The laser tracking system of the preferred embodiment includes a laser generator for generating a beam of laser energy, a fast steering mirror for steering the beam of laser energy such that it moves in a search pattern, and a receiving device that receives laser energy reflected from a targeted object and that causes the fast beam steering mirror to vary the search pattern in response to the reflected laser energy.

A tracking method associated with the preferred embodiment includes the steps of generating a beam of laser energy, steering the beam of laser energy in a search pattern, detecting a hit spot formed from laser energy being reflected from a targeted object, diminishing the size of the search pattern in response to the detection of the hit spot, and focusing the diminished search pattern on a feature of the targeted object corresponding to the hit spot.

From the subsequent detailed description taken in conjunction with the accompanying drawings and subjoined claims, other objects and advantages of the present invention will become apparent to those skilled in the art.

DETAILED DESCRIPTION OF THE PREFERRED EMBODIMENT

Figure 1:
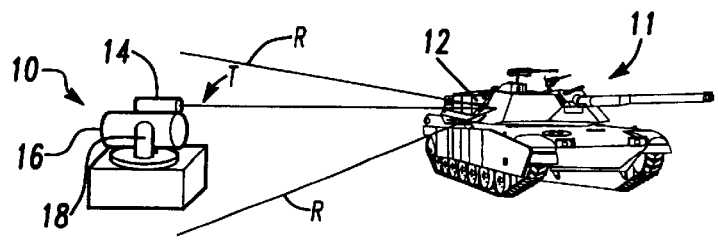
FIG. 1 illustrates the relationship between the laser tracking system of the present invention and a targeted object.

Referring to the drawings, FIG. 1 illustrates the relationship between a laser tracking system 10 and a targeted object 11 having a reflective vulnerable-point glint spot 12. The laser tracking system 10 includes a transmitter laser 14 which is mounted to a receiver telescope 16 such that the boresights of the transmitter laser 14 and the receiver telescope 16 are parallel. The transmitter laser 14 and the receiver telescope 16 are mounted together upon a rotating azimuth-elevation gimbal mount 18, as is well known in the art.

During operation, an operator or pilot directs a laser beam T, which is generated by the transmitter laser 14, to a general region of the front where a target such as targeted object 11 may be located. The laser tracking system 10 then begins a detailed search mode, during which the transmitter laser 14 sweeps the laser beam T in a search pattern across the suspect area by dithering the laser beam in orthogonal directions at different frequencies. The search pattern is preferably a Lissajou search pattern. When the laser beam T passes over a reflective curved surface such as the vulnerable-glint point 12 of the targeted object 11, the receiver telescope 16 receives this "hit spot" information as reflected laser energy R and the laser tracking system 10 records a "hit". For a given suspect region of the front, the laser tracking system 10 may record several hits, each indicating the presence of a potential target. The dithering of the laser beam T in a search pattern may be likened to the use of radar in conventional tracking systems.

If the operator, upon examining the recorded hits for the suspect region, decides that a target is likely located there, the operator places the laser tracking system 10 in an acquire and lock mode, during which it seeks and locks on to features of potential targets. During this mode of operation, the laser transmitter 14 dramatically reduces the size of the search pattern when a glint, such as vulnerable-point glint 12, is detected by the receiver telescope 16 during the wide search. After detection of the glint, the laser tracking system 10 drives the azimuth-elevation gimbal mount to focus the diminished search pattern upon the vulnerable-point glint 12 of the targeted object 11. During the acquire and lock mode, the laser tracking system 10 also uses imaging techniques to acquire centroid information of the targeted object 11.

After the laser tracking system 10 has locked on to the vulnerable-point glint 12 and acquired the image centroid of the targeted object 11, the receiver telescope 16 continues to receive glint and centroid information from the targeted object 11. A position sensing device contained within the laser tracking system 10 produces error signals corresponding to any relative movement between the laser tracking system 10 and the targeted object 11. The laser tracking system 10 uses this error information to rotate the azimuth-elevation gimbal mount 18 such that the laser tracking system 10 accurately tracks the targeted object 11.

The operating range of the laser tracking system will depend on weather conditions and on the chosen wavelength of the laser beam T. A wavelength in the mid-IR band (between 3.5 and 4.0 microns) provides the best tradeoff between atmospheric absorption and atmospheric turbulence. This choice will, however, be limited by the power and packaging requirements imposed by field use.

Figure 2:
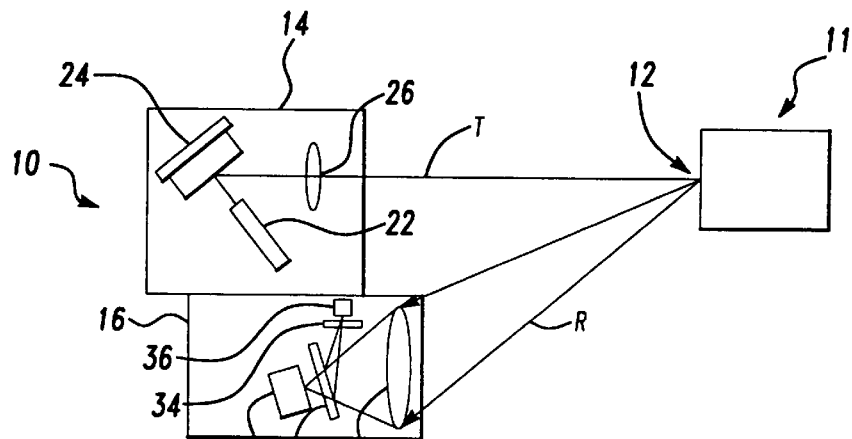
FIG. 2 is a more detailed illustration of the tracking system and targeted object depicted in FIG. 1.

FIG. 2 illustrates in more detail the relationship between the laser tracking system 10 and the targeted object 11. In discussing the operation of the laser tracking system with reference to this Figure, it is assumed that the operator has enabled the acquire and lock mode of operation.

Referring now to FIG. 2, the transmitter laser 14 and the receiver telescope 16 are mounted together and rotate via the azimuth-elevation gimbal mount 18 (FIG. 1). A laser 22 generates the beam of laser energy T and directs the beam T such that it is incident upon a fast steering mirror 24. The steering mirror 24 reflects the laser beam T so that it emerges from the transmitter laser 14 through an output lens 26. The fast steering mirror 24 responds to dither generation circuitry, described below in detail, within the laser tracking system 10 to orthogonally dither the beam of laser energy T in a high frequency, two dimensional search pattern.

As the laser beam T is dithered by the fast steering mirror 24 in its search pattern, the laser beam T may become incident upon a reflecting surface of a targeted object, such as the vulnerable-point glint 12 of targeted object 11. The laser beam T is then reflected from the vulnerable-point glint 12 as reflected laser energy R which is received by the receiver telescope 16. The reflected laser energy R enters the receiver telescope 16 through a receiving lens 28. The receiving lens 28 gathers the reflected laser energy R and directs it to a beam splitter 30, where the reflected laser energy R is divided. A first portion of the reflected laser energy R is directed by the beam splitter 30 to a position sensor 32, while a second portion of the reflected laser energy R is directed to a narrow band filter 34. The narrow band filter passes selected frequencies of incoming light to dither circuitry 36, which detects the presence of reflected laser energy R and supplies drive signals to the fast steering mirror 24. The narrow band filter 34 is frequency selective such that it eliminates extraneous light and only passes a range of frequencies centered about the frequency of the laser beam T generated by the transmitter laser 14. The dither circuitry 36 provides drive signals to the fast steering mirror 24 to cause the laser beam T to be steered in the Lissajou search pattern. The dither circuitry 36 also operates to detect laser energy R reflected from the vulnerable-point glint 12 on the targeted object 11.

When the vulnerable-point glint 12 is received by the receiver telescope 16 and detected by the dither circuitry 36, the dither circuitry responds by dramatically reducing the amplitude of its dither drive signals supplied to the steering mirror 24. The fast steering mirror 24 thereby steers the laser beam T in a search pattern which is much smaller than the original pattern. The diameter of the reduced search pattern should be roughly half or less of the beam diameter at the vulnerable-point glint. The position sensor 32 then detects the position of the vulnerable-point glint 12 relative to the azimuth-elevation gimbal mount 18 and supplies differential steering signals to the azimuth-elevation gimbal mount 18 in order to rotate the laser tracking system 10 such that the reduced search pattern is focused upon the detected vulnerable-point glint 12. After the system has locked on to the vulnerable-point glint 12, the receiver telescope 16 employs imaging methods well known in the art to acquire the centroid of the targeted object 11 which contains the vulnerable-point glint 12. If the vulnerable-point glint 12 is somehow obstructed or obscured so that the receiver telescope 16 no longer receives a glint, the dither circuitry 36 sends signals to the fast steering mirror 24 such that the larger search pattern is resumed in order to search for and acquire a new vulnerable-glint point.

As previously described, the azimuth-elevation gimbal mount 18 controls the orientation in space of the laser tracking system 10, and the position sensor 32 supplies drive signals to the azimuth-elevation gimbal mount 18 in order to re-orient the laser tracking system 10. In particular, the position sensor 32 supplies drive signals to the gimbal mount 18 such that the laser tracking system 10 is re-oriented in space when the position sensor 32 detects a change in position of the laser tracking system 10 relative to the targeted object 11. The operation of the position sensor 32 will be described in greater detail with reference to FIG. 4.

Figure 3:
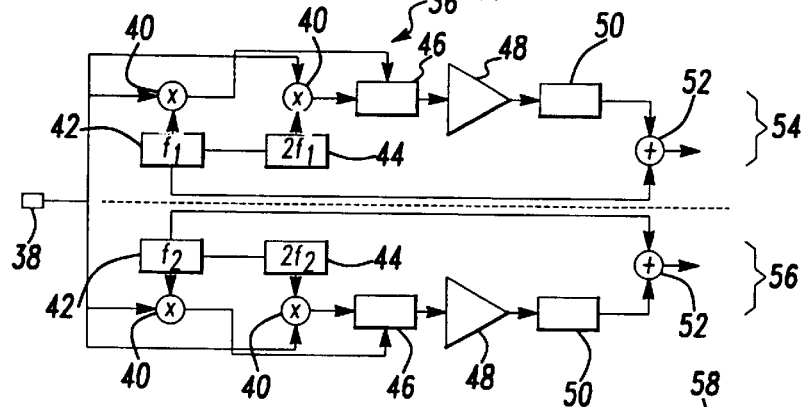
FIG. 3 is a diagram of the dither generation and detection circuitry employed in the laser tracking system.

FIG. 3 illustrates in detail the dither circuitry used to detect and generate dithering signals. The circuitry is similar to the circuitry disclosed in pending U.S. patent application Ser. No. 08/631,645, entitled "Laser Cross Body Tracking System and Method", which has been incorporated by reference. As shown in the figure, the X channel 54 and the Y channel 56 are identical. The reflected laser energy R is gathered by the receiver telescope 16 and conveyed to the dither detector 38 after passage through the narrow band optical filter 34. The detected dither signal is presented to the multipliers 40 to be combined with the signal from the dither generators 42 operating at frequencies $f_1$ or $f_2$ corresponding to a fundamental dither signal in the X or Y directions, respectively. The product then goes to the latching switch 46. Whether or not the latching switch 46 is closed depends on the presence of the second harmonic of the dither frequency. A dither frequency doubler 44 creates the second harmonic of the dither frequency which multiplies part of the incoming signal at multiplier 40 driven by the dither frequency doubler 44. The logic of the latching switch 46 is such that the latching switch 46 closes upon first detecting the presence of the second harmonic, indicating lock-up on a vulnerable-point glint 12. The latching switch 46 serves to prevent reinitiation of the large Lissajou search cycle in the event of a momentary second harmonic dropout, indicating a momentary loss of lock on the glint. The product then passes from the latching switch 46 to an integrator 48 and a driver amplifier 50. This product is then summed with the original fundamental dither signal at the summing amplifier 52. Whenever the receiver telescope receives laser energy R reflected from the vulnerable-point glint, the search pattern of the transmitted beam of laser energy T is reduced. Thus, the dither circuitry generates the large search pattern initially in order to search for a potential target. Then, upon detection of a glint such as vulnerable-point glint 12, the dither circuitry 36 generates a smaller search pattern which is ultimately focused upon the glint feature of the targeted object.

Figure 4:
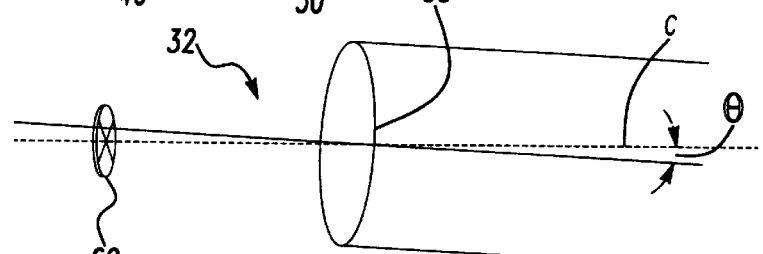
FIG. 4 is a diagram of the position sensing device employed in the laser tracking system.
Figure 4:
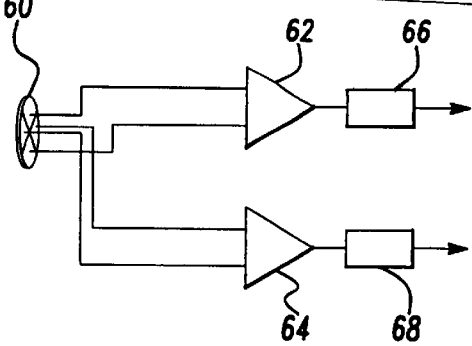

FIG. 4 illustrates in detail the position sensor 32 which is depicted generally in FIG. 2. Referring first to FIG. 2, The receiving lens 28 gathers laser energy R reflected from the vulnerable-point glint 12 of the targeted object 11. The receiver telescope also acquires an image centroid of the targeted object 11 (not shown). The image energy and the laser energy R reflected from the vulnerable-point glint 12 enter the receiver telescope 16 and pass through the beam splitter 30 before being received by the position sensor 32. Now referring to FIG. 4, the image energy and the laser energy R reflected from the vulnerable-point glint 12 pass through a position sensor input lens 58, which focuses the laser and image radiation upon a quadrant detector 60. In effect, the quadrant detector 60 determines the image centroid. The quadrant detector 60 is electrically connected to azimuth and elevation difference amplifiers 62 and 64, respectively. The differential amplifiers 62 and 64 are electrically connected to azimuth and elevation drive amplifiers 66 and 68, respectively. The position sensor 32 is oriented within the receiver telescope 16 such that when the laser tracking system 10 is pointed directly at the targeted object 11, an angle θ between a centered line of sight C and the incoming light rays containing the image and glint information is nominally zero. The quadrant detector 60 is operable to detect the image centroid of the targeted object 11 as well as the laser energy R reflected from the vulnerable-point glint 12. If the image line-of-sight deviates by some angle θ from the centered line of sight C, a differential steering signal is developed resulting from the asymmetrical image spot centroid distribution on the quadrant detector 60. The differential steering signal is resolved into X and Y components, depending upon the orientation of the position sensor 32 relative to the gimbal mount 18 and the targeted object 11. The resolved differential steering signal components are then supplied to the difference amplifiers 62 and 64, and the drive amplifiers 66 and 68 in order to drive the azimuthelevation gimbal mount 18. When the laser tracking system 10 is nominally centered on the targeted object 11, the differential steering signals are null. Hence, the azimuth-elevation gimbal mount 18 will drive the laser tracking system 10 to point at the target, thereby automatically adjusting for any relative motion between the laser tracking system 10 and the targeted object 11.

Figure 5:
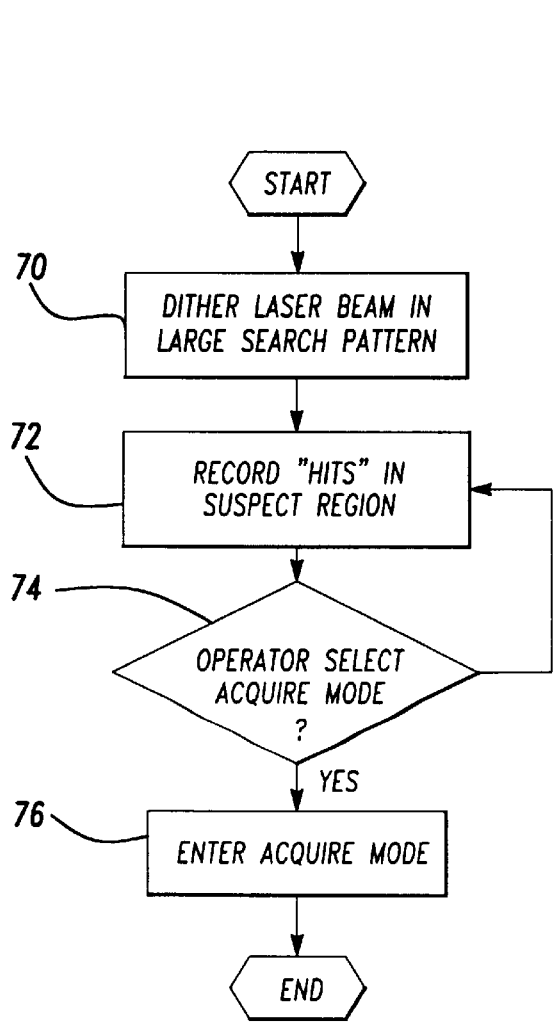
FIG. 5 is a flowchart illustrating the operation of the laser tracking system while in Operator Selection Mode.
Figure 6:
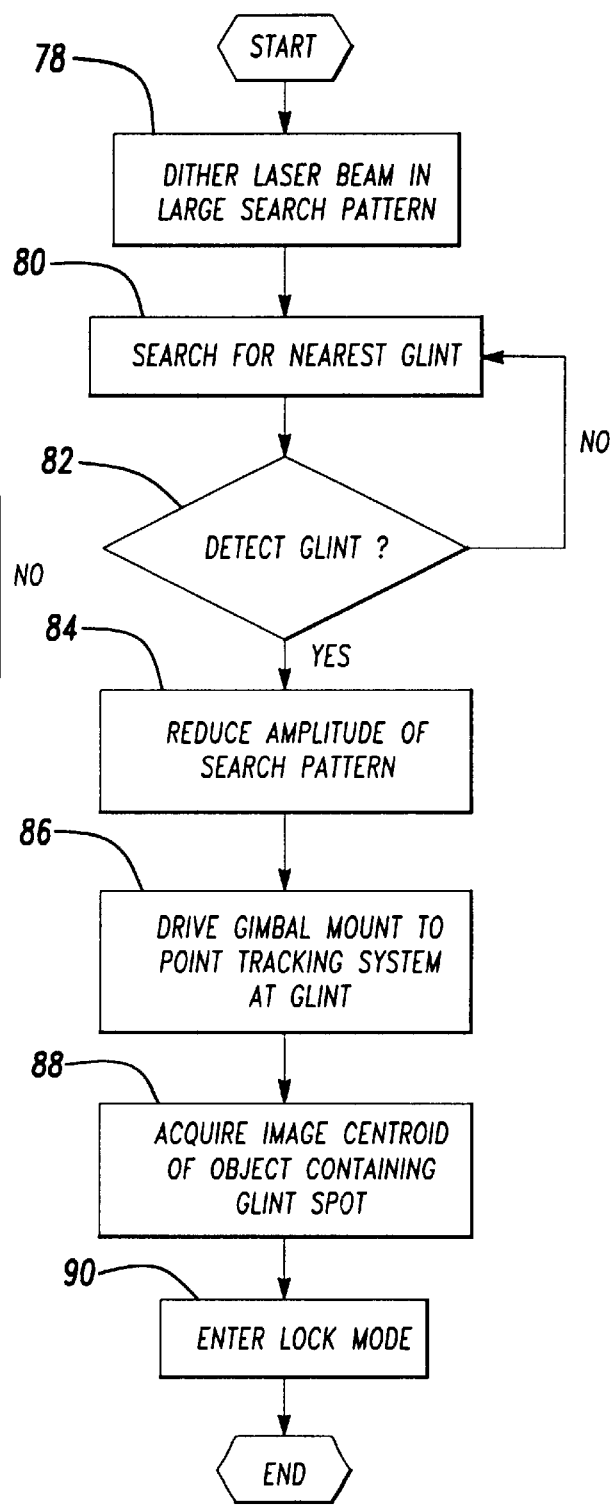
FIG. 6 is a flowchart illustrating the operation of the laser tracking system while in Acquire Mode.
Figure 7:
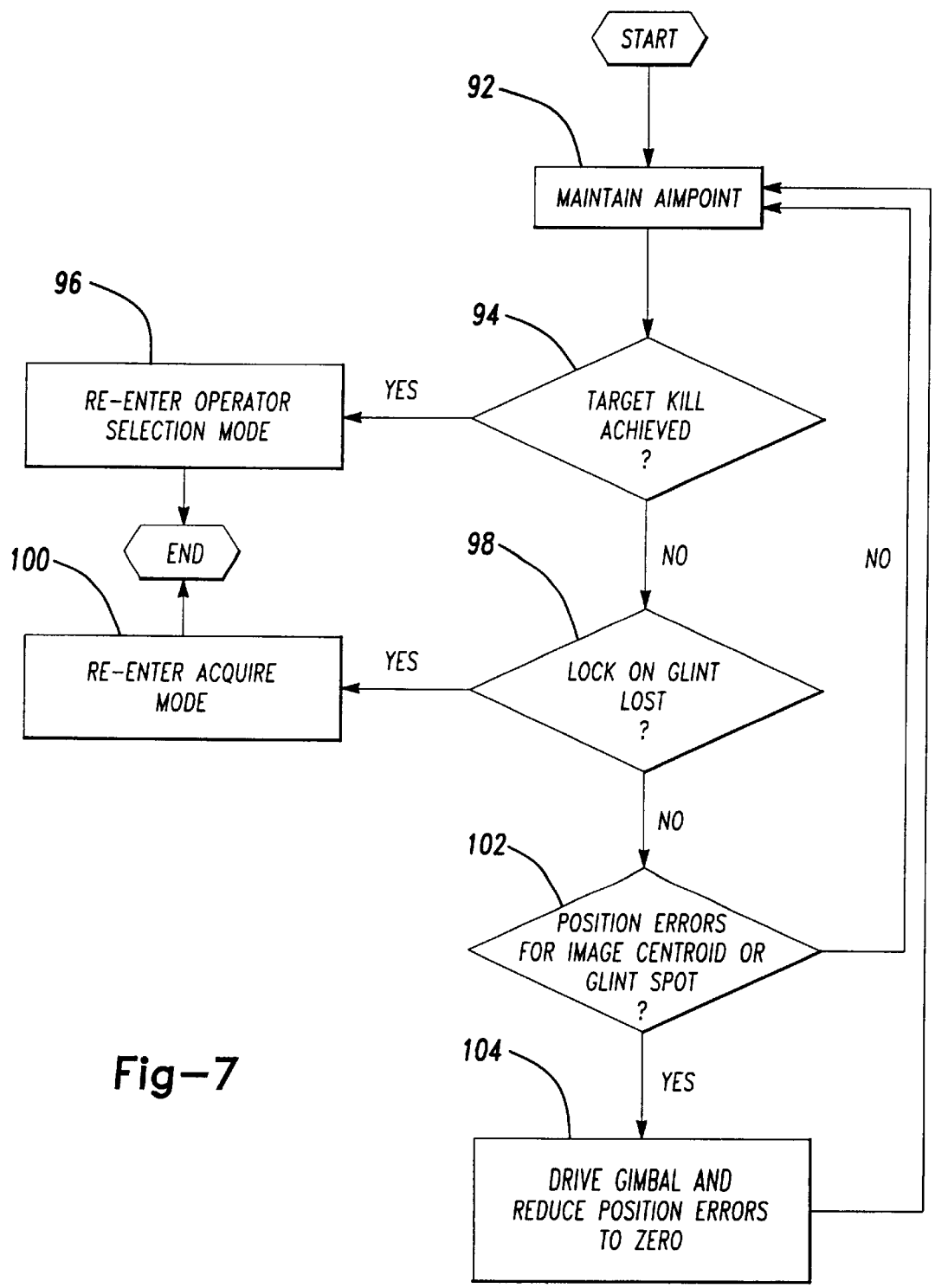
FIG. 7 is a flowchart illustrating the operation of the laser tracking system while in Lock Mode.

Reference to FIGS. 5, 6 and 7 will further clarify the operation of the laser tracking system 10. These flowchart figures are presented as models of the methods associated with the laser tracking system of the present invention. While these flowcharts illustrate the essential steps of the laser tracking method presented, it should be understood that these steps may be re-ordered and combined with other steps as necessary.

FIG. 5 details the steps by which a human operator directs the laser tracking system to enter into a mode where it acquires a glint spot such as vulnerable-point glint 12. The operator first directs the laser tracking system to a region or portion of the front where a target object may be located. At step 70, the laser beam T is dithered by the laser tracking system 10 in a large search pattern, preferably a Lissajou sinusoidal search pattern. At step 72, the laser tracking system 10 records "hits" in the suspect region which occur when the laser beam T is incident upon a reflective curved surface during the course of its search pattern. The operator then examines the data pertaining to the hits recorded for the suspect region, and makes a judgment at step 74 as to whether or not to put the laser tracking system 10 into Acquire Mode. Provided that the operator does not enable Acquire Mode, the laser tracking system will continue to record hits at step 72 as the laser beam T continues its search. At any point during the search, the operator may elect to place the laser tracking system 10 in Acquire Mode, as at step 76. The operation of the laser tracking system 10 while in Acquire Mode is depicted in FIG. 6.

FIG. 6 depicts operation of the laser tracking system 10 while in Acquire Mode, in which it locates a reflective curved surface, or glint spot, to lock on to and track. At step 78, the laser tracking system 10 continues to dither the laser beam T in the large search pattern. As the laser beam is dithered in the large search pattern, the laser tracking system 10 searches at step 80 for a reflective curved surface, or glint spot, in the vicinity of the boresight of the transmitter laser 14. Once a glint is detected at step 82, the laser tracking system immediately reduces the amplitude of the search pattern at step 84. At step 86, the position sensor 32 then generates differential steering signals in order to drive the azimuth-elevation gimbal to re-orient the laser tracking system 10 so that the diminished search pattern is focused upon the detected glint spot. Once the laser tracking system 10 is nominally aimed at the detected glint, the laser tracking system 10 acquires at step 88 an image centroid of the object containing the detected glint spot, and the system then enters lock mode at step 90. The operation of the system while in Lock Mode is depicted in FIG. 7.

FIG. 7 describes in flow chart form the operation of the laser tracking system once the system has detected and locked upon a glint spot such as vulnerable-point glint 12 of targeted object 11. At step 92, the laser tracking system 10 maintains the aim point established during the Acquire Mode of operation. At this point, the centered line of sight C of the position sensor 32 is nominally centered upon the detected glint spot 12 and the image centroid of the targeted object 11. In this nominally-centered state, the differential steering signals sent to the azimuth-elevation gimbal 18 are null. At step 94, the system will exit Lock Mode and re-enter the Operator Selection Mode at step 96 if a target kill has been achieved. Absent a target kill, the operator may elect at any time to remove the system from Lock Mode and reenter Operator Selection Mode. At step 98, the laser tracking system determines whether the detected glint has become obscured, shielded or otherwise lost, and if so, the laser tracking system re-enters the Acquire Mode at step 100. As described previously, the logic of the latching switches 46 in the dither circuitry 36 prevent re-initiation of a search cycle if the glint is lost for a short period of time. Provided that the glint is not lost or obscured, the laser tracking system determines at step 102 whether there has been any relative target-tracker motion since the aim point was established. If the image centroid or the laser hit spot deviates by some angle 0 from the centered line of sight C, the position sensor 32 creates differential steering signals at step 104 to drive the azimuth-elevation gimbal 18, thereby reducing the detected position errors to zero. If there are no position errors, the laser tracking system simply maintains the desired aim point, as at step 92. At the conclusion of step 104, the laser tracking system is once again nominally centered upon the targeted object 11, and the system returns to maintaining aim point at step 92 and remains in Lock Mode.

In summary, the laser tracking system provides an improved device and method for tracking a targeted object. The tracking system employs a laser beam designator which searches a suspect region for potential targets. Upon detection of a potential target, the laser tracking system varies the search pattern of the laser beam designator and focuses it upon a vulnerable feature of the potential target. In conjunction with laser designation, the tracking system also uses imaging methodologies to lock on to an image centroid of the targeted object. After locking on to the target, the laser tracking system continuously generates positional error signals in a closed loop manner, allowing a desired aim point to be automatically maintained without human intervention until a target kill is achieved.

Although the invention has been described with particular reference to a preferred embodiment thereof, variations and modifications can be effected within the spirit and scope of the following claims.

What is claimed is:

1. A laser tracking system for tracking a target, comprising:
   a laser generator for generating a beam of laser energy;
   a beam steerer for steering said beam of laser energy, and for causing said beam of laser energy to move in a search pattern;
   a receiving device that receives laser energy reflected from a targeted object and that causes said beam steerer to vary said search pattern in response to said reflected laser energy, said receiving device being operable to determine an angular displacement between said reflected laser energy and a reference axis of said receiving device; and
   a drive device coupled to said receiving device, said drive device providing rotation of said beam steerer and said receiving device in response to drive signals generated by said receiving device.

2. The system of claim 1, wherein said beam steerer steers the beam of laser energy so as to oscillate said beam of laser energy.

3. The system of claim 2, further comprising a first dither generator for causing said beam steerer to dither said beam of laser energy in a first direction and a second dither generator for causing said beam steerer to dither said beam of laser energy in a second direction.

4. The laser tracking system of claim 1 wherein said receiving device comprises:
   a positioned sensor operable to receive an incident beam of energy containing target tracking information and to determine an angular displacement between said incident beam of energy and said reference axis of said receiving device; and
   a glint detector that receives said incident beam of energy and that causes the size of said search pattern to be reduced when said reflected laser energy is detected in said incident beam of energy.

5. The system of claim 4 wherein said position sensor is responsive when said incident beam of energy contains said reflected laser energy.

6. The system of claim 4 further comprising a beam splitter for separating said incident beam of energy into separate components to be delivered to said position sensor and said glint detector.

7. The system of claim 4 wherein said position sensor generates an error signal corresponding to said angular displacement, thereby causing said drive device to rotate said laser tracking system to drive said angular displacement to zero.

8. The system of claim 4 wherein said glint detector and said position sensor operate to collectively reduce the size of said search pattern and focus said search pattern on a detected feature of said targeted object.

9. The system of claim 4 further comprising a frequency selective filter for processing said incident beam of energy before it is received by said glint detector.

10. The system of claim 4 wherein said position sensor is responsive when said incident beam of energy contains targeted object centroid information.

11. A laser based tracking method comprising the steps of:
    generating a beam of laser energy;
    steering said beam of laser energy in a search pattern;
    detecting a hit spot formed from laser energy being reflected from a targeted object;
    measuring an angular displacement between said hit spot and a reference axis;
    generating an error signal corresponding to said angular displacement;
    orienting a tracking device to reduce said errors signal to zero;
    diminishing the size of said search pattern in response to said step of detecting said hit spot; and
    focusing said diminished search pattern on a feature of said targeted object corresponding to said hit spot.

12. The method of claim 11 further comprising detecting a target centroid on said targeted object.

13. The method of claim 12 wherein the focusing step comprises the steps of:
    measuring an angular displacement between said target centroid and a reference axis;
    generating an error signal corresponding to said angular displacement; and
    orienting said tracking device to reduce said error signal to zero.

* * * * *